(No Model.) 4 Sheets—Sheet 1.
J. C. & G. A. CUNNINGHAM.
LOW BINDING HARVESTER.
No. 368,910. Patented Aug. 23, 1887.
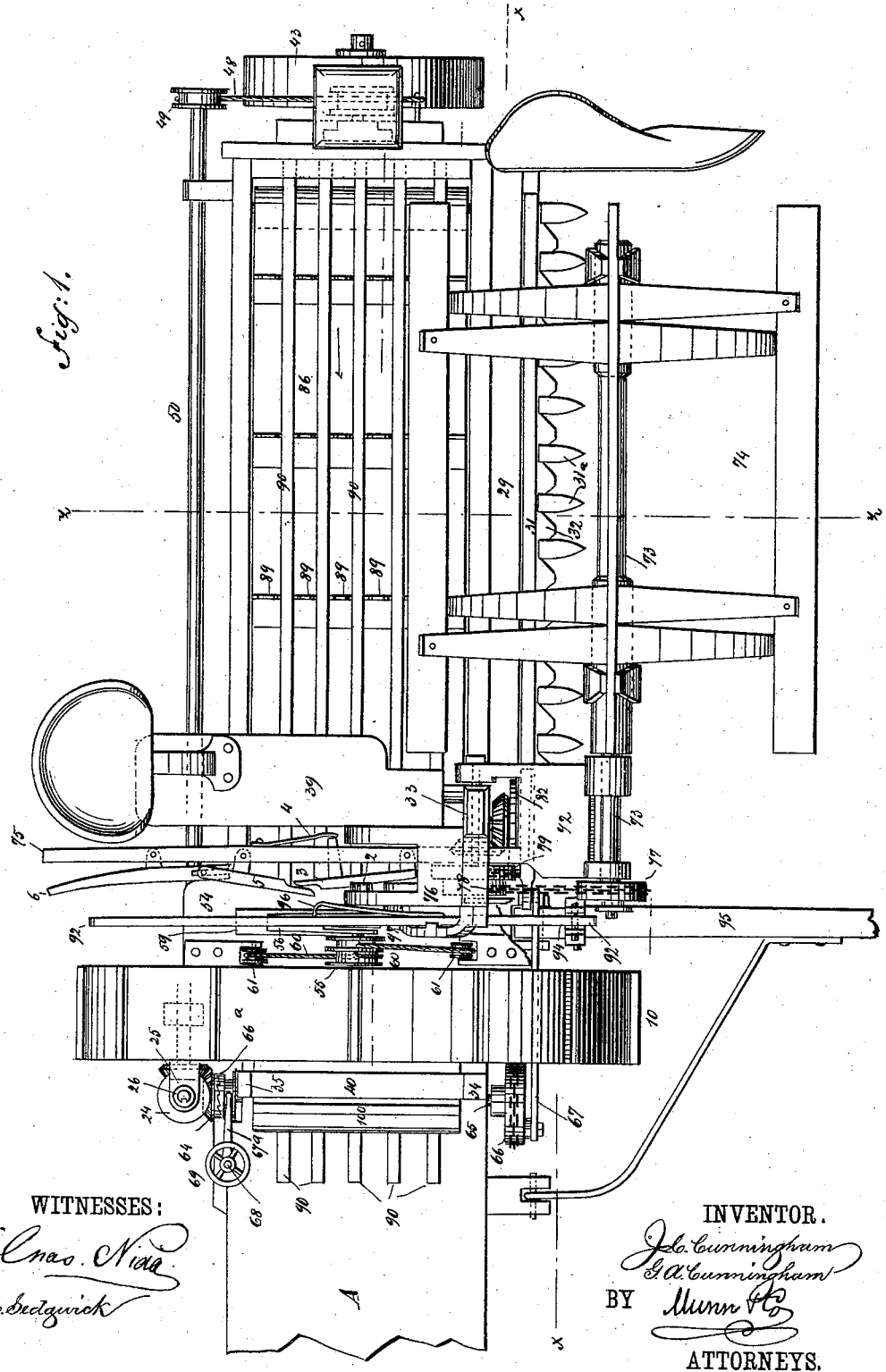
WITNESSES:
Chas. N...
C. Sedgwick
INVENTOR.
J. C. Cunningham
G. A. Cunningham
BY Munn & Co
ATTORNEYS.

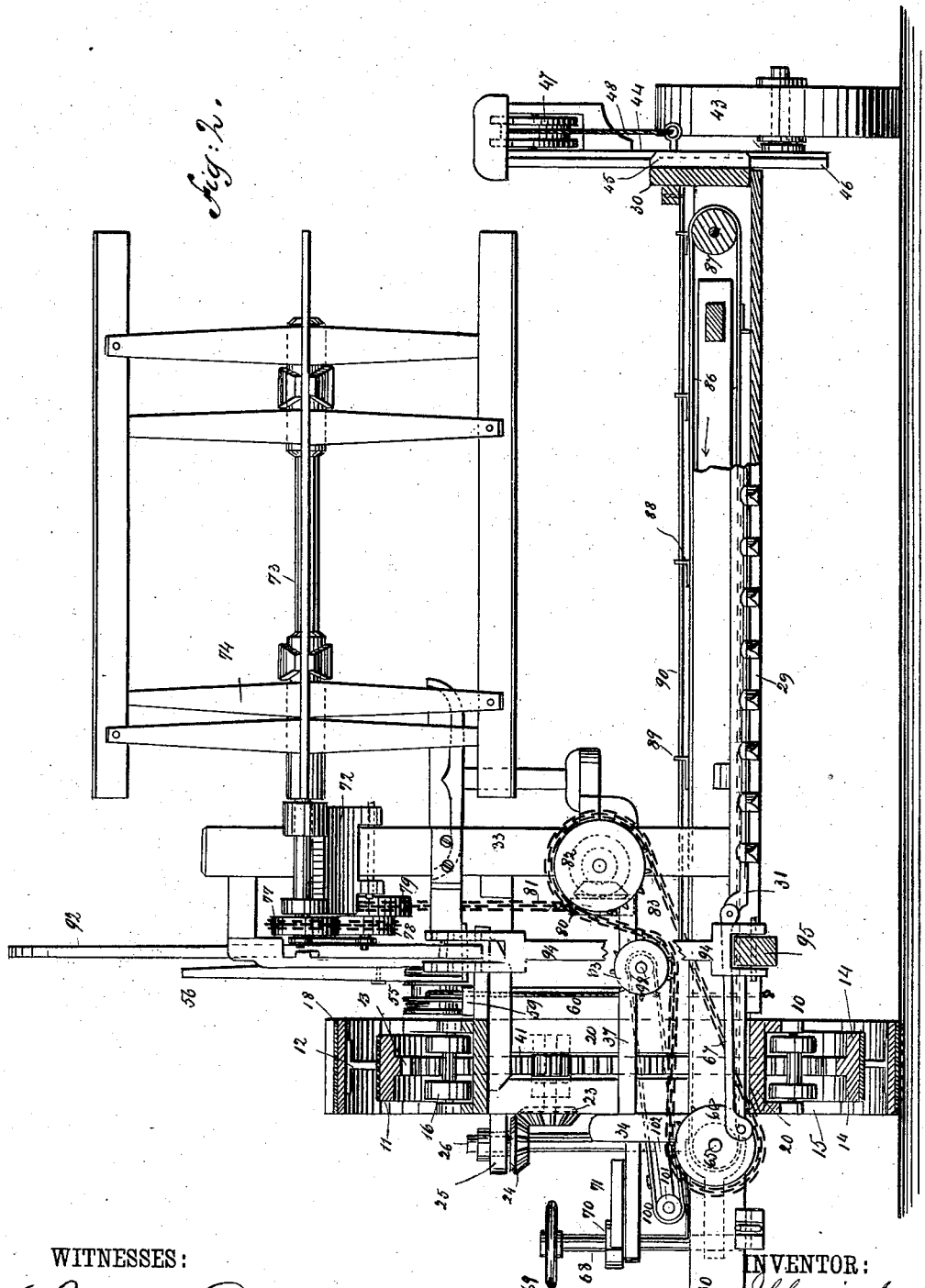

(No Model.) 4 Sheets—Sheet 3.
J. C. & G. A. CUNNINGHAM.
LOW BINDING HARVESTER.
No. 368,910. Patented Aug. 23, 1887.
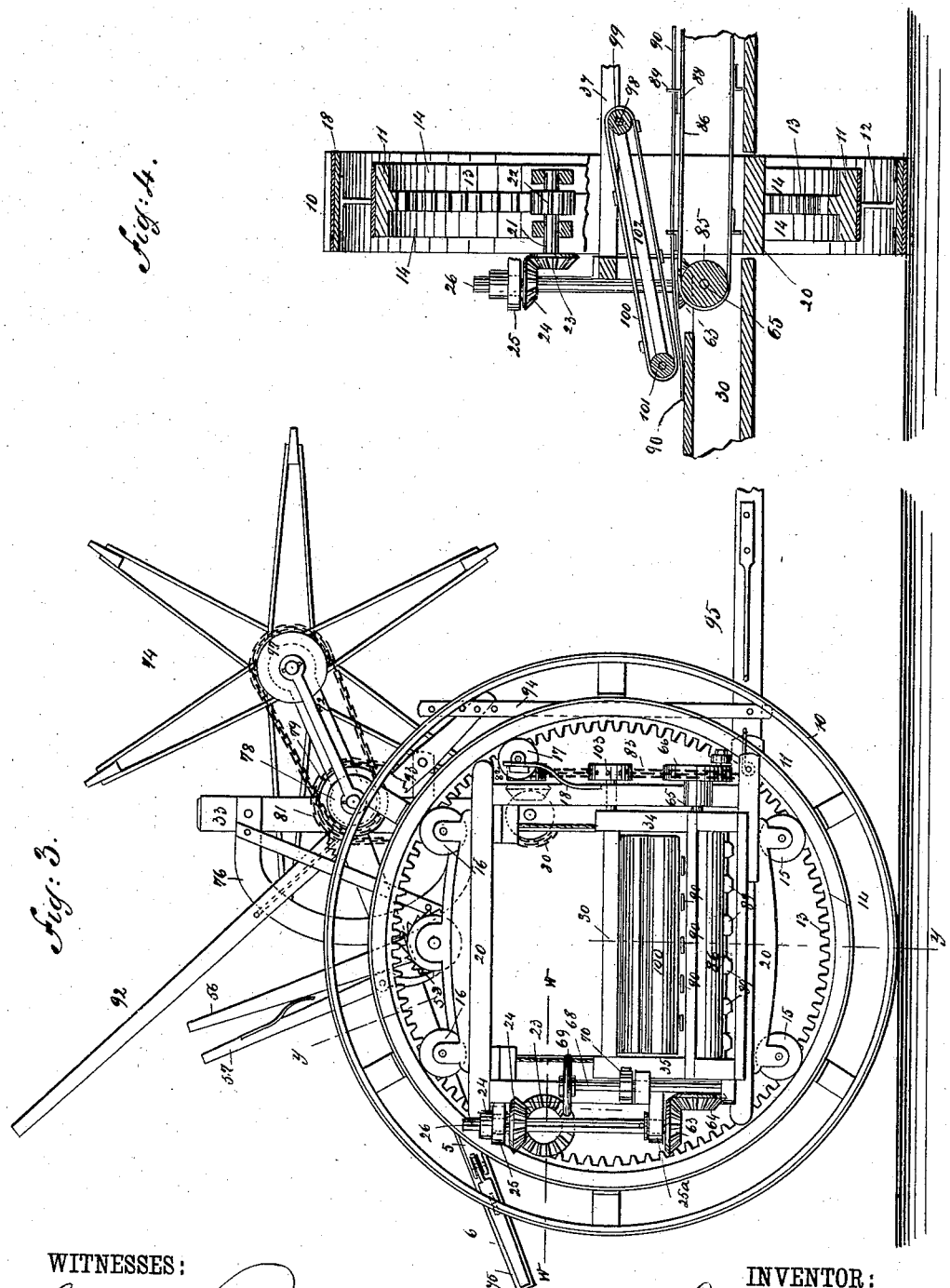
WITNESSES:
INVENTOR:
J. C. Cunningham
G. A. Cunningham
BY Munn & Co.
ATTORNEYS.

(No Model.) 4 Sheets—Sheet 4.
J. C. & G. A. CUNNINGHAM.
LOW BINDING HARVESTER.
No. 368,910. Patented Aug. 23, 1887.
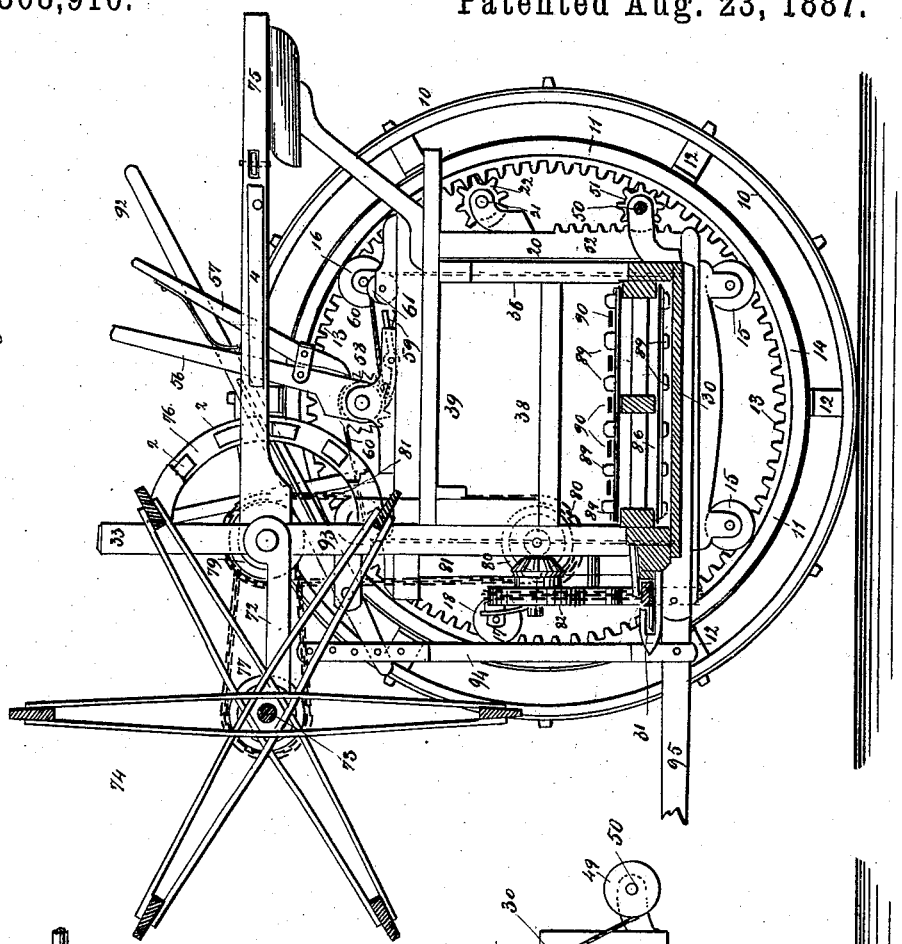
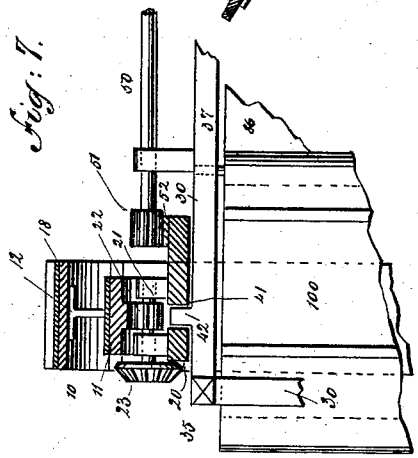
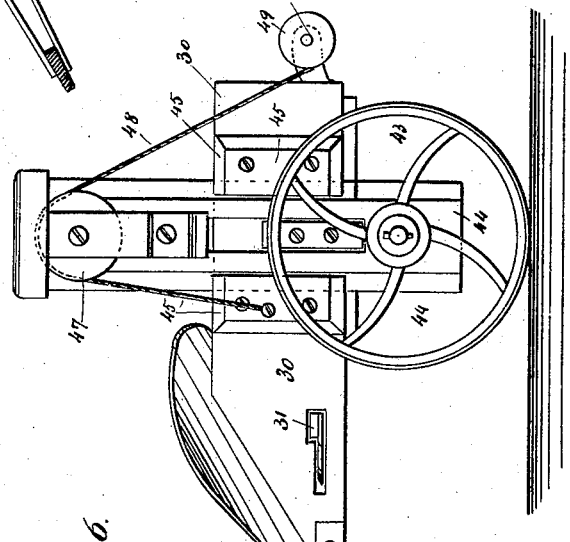
WITNESSES:
INVENTOR:
BY
ATTORNEYS.

UNITED STATES PATENT OFFICE.

J. CALDER CUNNINGHAM AND GEORGE A. CUNNINGHAM, OF WASHINGTON, KANSAS.

LOW-BINDING HARVESTER.

SPECIFICATION forming part of Letters Patent No. 368,910, dated August 23, 1887.

Application filed January 8, 1887. Serial No. 223,794. (No model.)

*To all whom it may concern:*

Be it known that we, J. CALDER CUNNINGHAM and GEORGE A. CUNNINGHAM, of Washington township, in the county of Jackson (St. Mary's post-office, in the county of Pottawatomie) and State of Kansas, have invented a new and Improved Low-Binding Harvester, of which the following is a full, clear, and exact description.

This invention relates to a novel form of low-binding harvester wherein the grain is carried to the binding mechanism by means of a continuous endless carrier-belt that is arranged upon a level with or slightly above that of the binding-table, one of the main objects of the invention being to carry the grain directly to the binding-table. Many other objects, however, are aimed at and accomplished by the novel form of harvester illustrated in the drawings, and to be hereinafter described, and specifically pointed out in the claims.

Reference is to be had to the accompanying drawings, forming a part of this specification, in which similar figures of reference indicate corresponding parts in all the views.

Figure 1 is a plan view of our improved form of harvester. Fig. 2 is a longitudinal sectional elevation taken on the broken line *x x* of Fig. 1. Fig. 3 is an end view of the machine, the binding-table being in the foreground. Fig. 4 is a longitudinal sectional elevation of a portion of the machine, the view being taken on line *y y* of Fig. 3. Fig. 5 is a cross-sectional view taken on line *z z* of Fig. 1. Fig. 6 is a view of the left-hand end of the machine, and Fig. 7 is a sectional detail view taken on line *w w* of Fig. 3.

In constructing such a harvester as the one illustrated in the drawings above referred to, we provide a main drive-wheel, 10, within which there is mounted an internally-toothed hoop or wheel, 11, the drive-wheel proper and the hoop 11 being connected by supports 12, that are arranged as clearly shown in the drawings.

Upon each side of the rack 13 of the hoop 11 there is a way, 14, upon which there rest rollers 15, that serve to support a rectangular frame, 20, this frame being guided above by other rollers, 16, and being pressed to the rear by rollers 17, that bear against the ways 14, these rollers being mounted upon a spring-bracket, 18, as probably best shown in Fig. 3.

To the rear of the frame 20 there is mounted a short shaft, 21, that carries a pinion, 22, said pinion engaging with the rack 13 of the hoop 11. Upon one end of the shaft 21 there is mounted a bevel-gear, 23, that engages with a bevel-gear, 24, that is supported by a bracket, 25, and arranged to turn with a vertical shaft, 26, sliding in said gear, the bracket 25 being fixed to the frame 20, while the shaft 26 is carried by a bracket, 25ª, fixed to a horizontal frame, 30, which carries a finger-bar, 29, and a sickle-bar, 31, the finger-bar being provided with guard-fingers 31ª, while the sickle-bar is provided with knives or cutters 32, the parts operating in the usual well-known manner, as will be presently described. This frame 30 extends through the frame 20 and carries four upwardly-extending posts, 33, 34, 35, and 36, horizontal strips 37 being arranged between the posts 33 and 34 and 35 and 36, while the posts 33 and 36 are connected by a horizontal cross-rod, 38, and by an upper cross-piece or platform, 39, and the posts 34 and 35 are connected by a cross-piece, 40. The frame 20 is formed with vertical ways 41, within which there ride projections 42, which extend outward from longitudinal strips 37, the arrangement being such that the frame 30 may be raised or lowered within the frame 20, as will be hereinafter explained. The opposite end of the frame 30 is supported by a wheel, 43, which carries an upwardly-extending post, 44, which is held to the end of the frame 30 by blocks 45, the approaching faces of which are undercut and extend over the rabbeted edges 46 of the post 44. At the top of this post 44 there is mounted a sheave, 47, over which there is passed a cord or chain, 48, one end of said cord or chain being secured to the frame 30, while the other end is made fast to a drum, 49, that is carried by a shaft, 50. To the opposite end of this shaft 50 there is secured a pinion, 51, which engages with a rack, 52, formed upon the frame 20. The frame 20 supports a platform, 54, upon which there is arranged a windlass, 55, that is operated by a lever, 56, said lever being provided with a hand-piece, 57, that engages with a ratchet, 58, carried by the windlass, while all retrograde movement of the windlass is prevented by means of a stop carried by a foot-lever, 59, that is mounted below the ratchet. To this windlass there are connected cords 60, which pass over sheaves 61 and downward, to be secured to the frame 30, the arrangement being such that by reciprocating the lever 56 and winding up the windlass the frame 30 will be raised within the frame 20, and in being so raised will cause the pinion 51 to revolve, which will wind the cord 48 upon the drum 49 and raise the extending end of the frame 30.

As before stated, the gear 24 is mounted so that the shaft 26 may slide therein, and this shaft 26 is carried by the frame 30, and at its lower end is provided with a gear, 63, that meshes with a gear, 64, carried by a horizontal shaft, 65, to the opposite end of which there is secured a sprocket-wheel, 66, and to which there is connected a connecting-rod, 67, extending to the cutter-bar 31.

In order that the shaft 65 may be thrown out of gear when desired, we mount the gear 64 loosely upon its shaft, and form said gear with one section of a clutch, 66$^a$, the other section of the clutch being mounted upon a feather, so that it will continually turn with the shaft 65. The sliding section of the clutch 66$^a$ is engaged by a lever-arm, 67$^a$, that is rigidly connected to a vertical shaft, 68, said shaft being provided with a hand-wheel, 69, and a ratchet-wheel, 70, said ratchet-wheel being engaged by a spring-pawl, 71, as best shown in Figs. 2 and 3.

The post 33 extends upward some distance above the horizontal strips 37, and upon this post there is mounted a swinging bearing, 72, in which there is journaled the shaft 73 of a reel, 74. A lever, 75, is rigidly connected to the swinging bearing 72, and this lever extends to the rear through a central slot that is formed in a rack, 76, this rack being provided with teeth or stops 2, that are arranged to be engaged by a catch, 3, that is pivoted to the lever 75 and normally pressed outward therefrom by a spring, 4. The end of this catch 3 is borne upon by a finger, 5, that is also pivoted to the lever, and this finger is engaged by a hand-piece, 6, so that when the hand-piece is moved toward the end of the lever the catch 3 will be disengaged from the stops 2, and the lever may be moved upward or downward, to raise or lower the reel 74. This reel 74 is provided with a sprocket-wheel, 77, that is engaged by a drive-chain driven by a sprocket-wheel, 78, said sprocket-wheel 78 being carried by a stud that is supported by the post 33. A second sprocket-wheel, 79, is rigidly connected to or made integral with the wheel 78, and receives its motion by means of a chain, 81, that runs in engagement with a sprocket, 80, that is studded to the lower portion of the post 33, this sprocket-wheel 80 being provided with a bevel-gear that engages with a corresponding gear carried by the sprocket-wheel 82, and this sprocket-wheel 82 is driven by means of a chain, 83, that runs in connection with the wheel 66 of the shaft 65, the arrangement being such that as the machine advances the motion of the shaft 65 will be transmitted through the medium of the connections named to the reel 74, and this reel may be revolved so as to carry the heads of the grain to the rear and over the frame 30, which is arranged as will be presently described, and at the same time the motion of the shaft 65 is transmitted to the cutter-bar through the medium of the conecting-rod 67.

The shaft 65 carries a drum, 85, over which there passes an endless carrier belt or apron, 86, that is also supported by a drum, 87. (See Fig. 2.) This belt 86 carries a number of comb-like cross-slats, 88, these slats 88 being formed with registering upwardly-extending teeth 89, between which there are arranged longitudinal strips 90, one end of these strips being supported by an outer cross-piece of the frame 30, while the other ends rest upon or are secured to the binding-table at the other end of the frame.

In order that the forward edge of the frame 30 may be moved upward or downward and the cutter-bar thereby brought to a proper angle, we provide a lever, 92, that is pivotally connected to a bracket, 93, carried by the post 33, and the short arm of this lever is in turn connected to a rod, 94, that is connected to the pole or tongue 95, said pole or tongue being in turn pivotally connected to the frame 30.

Upon one side of the lever 92 there is a spring, 96, which bears against the outer face of the rack 76, which serves to throw the opposite face of the lever into engagement with stops that are carried by a rack, 97, the arrangement being such that by raising or lowering the lever 92 the frames 20 and 30 may be slightly rocked within the revolving portion of the wheel.

The longitudinal strips 37 support the bearings of a shaft, 98, which shaft carries a drum or roller, 99, upon which there is mounted an endless belt, 100, said belt being arranged to pass over a drum, 101, that is carried by a frame, 102, said frame being loosely connected to the shaft 98. This shaft 98 is provided with a sprocket-wheel, 103, that is engaged by the upper length of the chain 83, so that as said chain is advanced the lower length of the belt 100 will move forward in a direction corresponding to that imparted to the upper length of the belt 86.

Such being the general construction of our improved form of low-binding harvester, the operation is as follows: The reel 74 is adjusted to proper height to operate upon the grain, the clutch 66$^a$ is thrown into engagement, the frame 30 adjusted, and the machine started forward, and as the machine advances the belt 86 will be moved in the direction of the arrow shown in connection therewith in Figs. 1 and 2, and the sickle-bar will be reciprocated, so that as the grain falls over to the rear (being so forced backward by the action of the wheel)

it will rest upon the longitudinal strips 90 and will be carried toward the binding-table by the teeth 89 of the slats 88 passing at this time through the central opening of the frame 20, as will be readily understood, thus avoiding the necessity of raising the grain prior to delivering it to the binding-table, the ends of the strips 90 serving as supports for the grain as it passes from the belt 86 to the binding-table, thus preventing the grain from clogging the movable portions of the machine.

Having thus fully described our invention, we claim as new and desire to secure by Letters Patent—

1. In a harvester, the combination, with the annular inner toothed or cogged wheel, of the outer frame mounted therein and carrying a pinion engaging with the teeth or cogs of said wheel and secured upon a shaft carrying also a beveled pinion, a vertically-sliding shaft provided with a feathered beveled pinion engaging the aforesaid beveled pinion, said shaft also carrying a second beveled pinion gearing with a pinion clutched upon the shaft carrying a drum, over which passes the endless carrier-belt, and the inner vertically-adjustable frame supporting said carrier-belt, and means for causing the vertical adjustment of said inner frame, substantially as and for the purpose set forth.

2. The combination of an internally-geared annular driving-wheel with a main frame within said wheel carrying a system of bevel-wheels, one of which is connected by suitable gearing with the annular driving-wheel, while a vertical feathered shaft carried by a vertically-adjustable inner frame and actuating suitable carrier mechanism thereon slides up and down through the other member of the system of bevel-wheels above mentioned, the inner frame also supporting a horizontal shaft carrying at one end a pinion engaging a vertical rack on the main frame and at the other end a pulley attached to a cord which controls the vertical adjustment of the grain-wheel, together with means for raising and lowering said inner frame, all arranged so that continuous motion is transmitted from the annular drive-wheel through the intermediate gearing on the main frame to the carrier mechanism on the inner frame at whatever point of vertical adjustment the latter may be, substantially as set forth.

3. In a harvester, the combination, with a drive-wheel provided with a single internal rack and ways, 14, of a frame, 20, rollers carried by said frame and arranged to rest upon the ways 14, a frame, 30, adjustably mounted within the frame 20, a pinion, 22, carried by the frame 20, a bevel-pinion, 23, carried by the shaft of the pinion 22, a shaft, 26, carried by the frame 30, a pinion, 24, mounted to slide upon the shaft 26 and supported by the frame 20, a horizontal shaft, 65, provided with a pinion, 64, and a sprocket-wheel, 66, a bevel-pinion, 63, carried by the shaft 26 and engaging with the pinion 64, a clutch, 66ª, arranged in connection with the pinion 64, a cutting mechanism carried by the frame 30, and a pitman extending from the said cutting mechanism to the sprocket-wheel 66, substantially as described.

J. CALDER CUNNINGHAM.
GEORGE A. CUNNINGHAM.

Witnesses:
JAMES G. STRONG,
AUGUST ERBACHER.